(12) United States Patent
Lighty et al.

(10) Patent No.: US 10,903,720 B2
(45) Date of Patent: Jan. 26, 2021

(54) STARTER/GENERATOR ELECTRICAL JOINT

(71) Applicants: Rolls-Royce Corporation, Indianapolis, IN (US); Rolls-Royce North American Technologies Inc., Indianapolis, IN (US)

(72) Inventors: Kerry Lighty, Plainfield, IN (US); Melissa Hughes, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 22 days.

(21) Appl. No.: 16/379,160

(22) Filed: Apr. 9, 2019

(65) Prior Publication Data

US 2020/0328654 A1    Oct. 15, 2020

(51) Int. Cl.
*F02N 11/04* (2006.01)
*H02K 23/52* (2006.01)
*H02K 7/18* (2006.01)
*F02C 7/275* (2006.01)
*F02C 3/04* (2006.01)
*B64D 27/10* (2006.01)

(52) U.S. Cl.
CPC ............ *H02K 7/1823* (2013.01); *B64D 27/10* (2013.01); *F02C 3/04* (2013.01); *F02C 7/275* (2013.01); *F05D 2220/32* (2013.01); *F05D 2220/76* (2013.01); *F05D 2230/60* (2013.01)

(58) Field of Classification Search
CPC .................................. B64D 27/10; F02C 3/04
See application file for complete search history.

(56) References Cited

U.S. PATENT DOCUMENTS

| | | |
|---|---|---|
| 4,729,218 A | 3/1988 | Haselbauer et al. |
| 6,437,535 B1 | 8/2002 | Sinha |
| 6,895,741 B2 | 5/2005 | Rago et al. |
| 7,508,086 B2 | 3/2009 | Huang et al. |
| 7,750,521 B2 | 7/2010 | Qu et al. |

(Continued)

FOREIGN PATENT DOCUMENTS

| | | |
|---|---|---|
| EP | 3246526 A1 | 11/2017 |
| EP | 3246527 A1 | 11/2017 |
| EP | 3246528 A1 | 11/2017 |

OTHER PUBLICATIONS

U.S. Appl. No. 16/379,159, filed Apr. 9, 2019 by Melissa Hughes et al.

*Primary Examiner* — Tulsidas C Patel
*Assistant Examiner* — Thomas K Quigley
(74) *Attorney, Agent, or Firm* — Shumaker & Sieffert, P.A.

(57) ABSTRACT

A starter generator located within a sump region of a turbofan engine and coupled to an adapter shaft. The adapter shaft rotationally coupled to the high pressure shaft, forward of a high pressure shaft bearing, and secured by a spanner nut. The engine makes use of two pluralities of electrical conductors, the first extends through an electrical conduit defined by a forward strut extending from the sump region to the outward casing, the second extends axially away from the electric starter. Each of the first plurality of electrical conductors makes reversible contact with a respective one of the second plurality of electrical conductors via an elbow/pin connector, producing a tight turn in area of limited space.

19 Claims, 13 Drawing Sheets

(56) References Cited

U.S. PATENT DOCUMENTS

| | | |
|---|---|---|
| 7,821,145 B2 | 10/2010 | Huang et al. |
| 9,752,508 B2 | 9/2017 | Geck et al. |
| 9,776,583 B2 | 10/2017 | Edwards |
| 2004/0232702 A1 | 11/2004 | He |
| 2011/0101693 A1 | 5/2011 | Goi |
| 2013/0098060 A1 | 4/2013 | Suciu |
| 2015/0054283 A1 | 2/2015 | Huang |
| 2016/0053690 A1 | 2/2016 | Perkinson |
| 2017/0334377 A1 | 11/2017 | Klemen |
| 2017/0335710 A1 | 11/2017 | Klemen |
| 2017/0335795 A1* | 11/2017 | Klemen .................. F02K 3/06 |

\* cited by examiner

STARTER/GENERATOR ELECTRICAL JOINT

CROSS-REFERENCE TO RELATED APPLICATIONS

This application is related to concurrently filed U.S. application Ser. No.16/379,159, titled "STARTER/GENERATOR", and first named inventor: Melissa Hughes. The entirety of this application is hereby incorporated by reference.

BACKGROUND

Turbine engines extract energy to perform work by compressing a working fluid, mixing a fuel into the compressed working fluid, igniting the fuel/fluid mixture, and expanding the combusted fuel/fluid mixture through a turbine. When a turbine is operating, a portion of the extracted energy is provided as the work input to the engine's compressor, thereby making turbine operation self-sustaining. Prior to reaching this self-sustaining point, the work input to drive the compressor must be supplied by some system other than the turbine of the engine. These other systems often incorporate a starter—such as an electric starter—that provides the motive force to turn the engine compressor, thereby providing an airflow to the turbine that may, eventually, provide enough work output to drive the compressor. Such starters are often also advantageously used as generators to supply electrical power.

For a subsonic missile application, the gas turbine engine design is required to be optimized to meet key performance objectives, achieve maximum affordability, and be sized for expendable, single-use. Future expendable missile applications should achieve better specific fuel consumption (SFC), further range, and increased power offtake compared to current missile platforms.

A key requirement, or "desirable," for these applications is to favor designs that do not use traditional cartridge pyrotechnics for engine starting. Therefore, other solutions are needed for engine starting. In addition, power offtake and electrical generation is needed during engine operation to power on-board missile guidance and accessories. Current applications use approximately 2-3 kW of nominal power offtake, with future applications expected to require 3-6 kW of nominal power offtake.

In addition, tight size constraints must be met on the engine envelope in order to fit within the missile platform. Typical constraints are to stay within 15" outer engine diameter and 28-31" axial length. Therefore, the entire engine, including accessories, must be designed with consideration to these packaging requirements. Start requirements on cruise missiles may be broken into three launch categories: land, sea, and air. Land and sea launch applications utilize solid rocket(s) to boost the missile up to a high enough speed enabling both ram air and a pyrotechnic charge to bring the gas turbine engine quickly up to light-off speed and subsequent full engine thrust. For air launch, solid rocket boost is not necessary, as air vehicle speed and gravity provide a similar function to the solid rocket(s).

A shaft-mounted integrated starter generator (ISG) may be utilized for any of these launch applications to assist during the start-up phase and eliminate the pyro-technic start. Typical ISGs for other gas turbine engine applications are sized for hundreds or thousands of start torque cycles, which drive much larger machine size making shaft integration difficult to unachievable. However, reduced durability requirements may allow for smaller space claims and thus a more compact ISG may be used in some applications, for example in a cruise missile where the number of start cycles is very small, enabling much higher starting torque for a given machine size through increased current density. Additional advantages of using a shaft mounted ISG is the ability to electrically drive any necessary accessories. This allows for elimination of the accessory gearbox and a reduction in volume, weight, complexity, and cost. The reduction in volume and weight allows for range to be maximized through reduced fuel burn and/or addition of more fuel.

There are several difficulties that arise in providing electrical power generation in these expendable engines. One is the routing of the power cables from the sump across the flow path to the accessories requiring electrical power. The more power the cable is expected to carry, the larger diameter, or cross section, is required to safely transmit power. Typically, the cables would extend from the ISG stator 153 all the way to the outside of the engine in one long pigtail. Additionally, multiple wires may be twisted into one larger cable. These larger cables do not bend easily and may be difficult to feed through passages. Another difficulty is the integration of the ISG with the high pressure shaft or low pressure shaft, given the limited space available and the desire to keep the engine compact.

SUMMARY

Disclosed is a turbofan engine including a high pressure spool and a low pressure spool. The low pressure spool includes a low pressure shaft operably connected to a fan. The high pressure spool including a high pressure shaft operably connected to a high pressure turbine, the low pressure shaft and the high pressure may be being co-axial with one another. A sump region may be axially concurrent with a forward portion of the low pressure shaft and located axially forward the forward most portion of the high pressure shaft. The sump region may be defined radially between the forward portion of the low pressure shaft and an inner boundary of a support frame. A forward strut may extend radially from the sump region through the air inlet passage to a radially outward casing, the forward strut may define an electrical conduit. A first plurality of electrical conductors may extend through the electrical conduit from an elbow to an outer interface on the radially outward casing. An electrical device within the sump region may have a second plurality of electrical conductors extending axially away from the electrical device and parallel to the low pressure shaft. The elbow may have a first interface facing radially outward and a second interface facing axially forward. The first plurality of electrical conductors may extend through the first interface, and the second plurality of electrical conductors may extend through the second interface. Each of the first plurality of electrical conductors may reversibly contact a respective one of the second plurality of electrical conductors within the elbow.

In some embodiments, an O-ring positioned between the second interface and the electrical device, wherein the second plurality of electrical conductors pass through the O-ring. In some embodiments, each of the first plurality of electrical conductors extends radially into the first interface of the elbow a different amount than the others. In some embodiments the first plurality of electrical conductors is insulated within the elbow and each of the first plurality of electrical conductors is exposed within the elbow at a different radial location than the others. In some embodiments, the elbow is radially and axially fixed with respect to the forward strut. In some embodiments, each of the second plurality of electrical conductors extends axially into the second interface of the elbow a different amount than the others. In some embodiments, the second plurality of electrical conductors is insulated within the elbow and each of the second plurality of electrical conductors is exposed within the elbow at a different axial location than the others. In some embodiments, the different axial locations of the second plurality of electrical conductors corresponds with the respective different radial locations of the first plurality of electrical conductors. In some embodiments, insulation may separate the first plurality of electrical conductors within the conduit. In some embodiments, the electrical device may be a generator. In some embodiments, the electrical device may be a starter. In some embodiments, the first plurality of electrical conductors may be ribbons. In some embodiments, each of the plurality of electrical conductors may have a radius of curvature greater than three times their respective diameter. In some embodiments, an angle formed between a respective one of the first plurality of electrical conductors and one of the second plurality of electrical conductors may be greater than 0 degrees and less than or equal to 90 degrees.

Also disclosed is a method of installing an integrated starter generator in turbofan engine. The integrated starter generator may include a pair of conductive probes which may extend axially from the integrated starter generator. The turbofan engine may include a strut, an air passage and a shaft. The strut may contain a pair of electric conductors. Each of which may have a radius of curvature greater than three. The strut may pass through the passage. The method may include; positioning the pair of electric conductors through the strut, each of the pair of electric conductors may have a radial inner end and a radial outer end; connecting an electrical joint on the pair of electric conductors at the radial inner end; restricting the axial and radial position of the electrical joint to a predetermined position; aligning the integrated starter generator to be concentric with the forward end of the shaft; axially moving the integrated starter generator over the shaft until the pair of conductive probes are in electrical contact with the pair of electric conductors within the electrical joint; attaching the integrated starter generator to the shaft, wherein the integrated starter generator is co-axial with the shaft.

In some embodiments an O-ring may be compressed between the integrated starter generator and the electrical joint via the axial movement. In some embodiments, the O-ring may be placed over the pair of probes prior to axially moving the integrated starter generator. In some embodiments, the inner ends of the pair of electrical conductors may be offset radially within the electrical joint and the terminal ends of the pair of conducting probes may be offset to axially align with the respective inner ends of the pair of electrical conductors. In some embodiments, the shaft may be a high pressure shaft.

Also disclosed is an electric supply line in a space, which may include, a first line and a second line. The first and second lines may be parallel to one another and extend in a first direction; the first and second lines may have a radius of curvature greater than 3 times their respective diameters. The supply line may also include a third line and a fourth line. The third and fourth lines may be parallel to one another, and extend in a second direction. The first direction and second direction may be perpendicular to one another. The first line may have a first junction point and the second line may have a second junction point. The first and second junction points may lie within a plane intersecting the first and second lines, and the second junction point, may extend in the first direction beyond the first junction point. The third line may have a third junction point, and the fourth line may have a fourth junction point. The third and fourth junction points mat lie within a plane intersecting the third and fourth lines, and the fourth junction point may extend in the second direction beyond the third junction point. The first and third junction points may be in electrical contact with one another. The second and fourth junction points may be in electrical contact with one another, such that if a circle had tangent points on the first line and the third line, the tangent points may be perpendicularly separated by less than 3×D, where D=minimum radius of the first and third lines.

BRIEF DESCRIPTION OF THE DRAWINGS

The following will be apparent from elements of the figures, which are provided for illustrative purposes.

Figure 1:
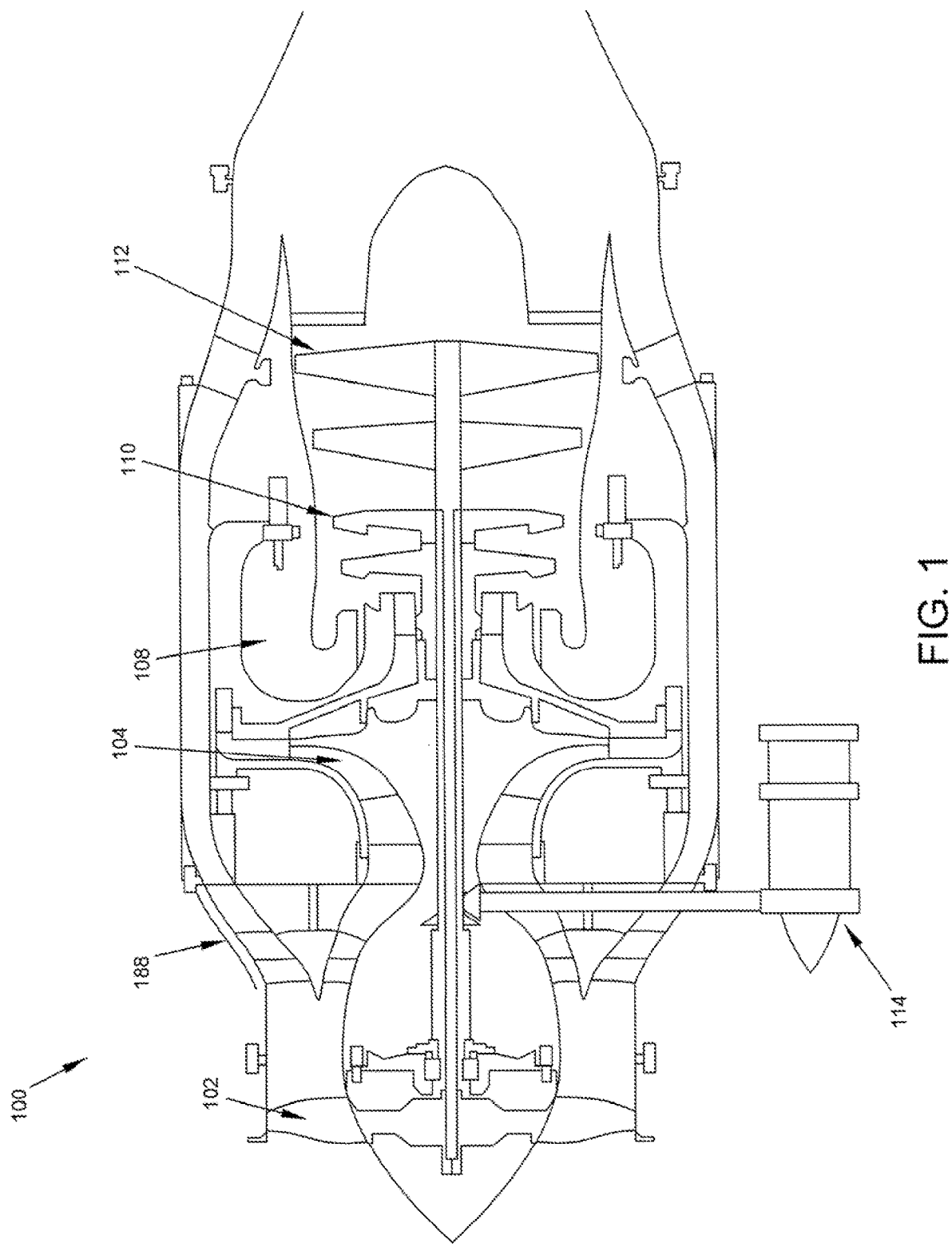
FIG. 1 is a perspective view of a turbine engine and an auxiliary gearbox.

The present application discloses illustrative (i.e., example) embodiments. The claimed inventions are not limited to the illustrative embodiments. Therefore, many implementations of the claims will be different than the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Illustrated in FIG. 1 is a perspective view of a turbine engine 100. The turbine engine 100 may be a gas turbine engine, and may comprise a fan 102, compressor section 104, combustor 108, turbine sections 110 and 112, and an auxiliary gearbox 114. Compressor section 104 and turbine section 110 may each be coupled to a common spool/shaft, often known as the high pressure spool/shaft. Similarly, the fan section 102 and turbine section 112 may each be coupled to a different common spool/shaft, often known as the low pressure spool/shaft. While not shown, a low pressure compressor may also be included on the low pressure spool. Fan 102 is also coupled to the low pressure spool/shaft either directly such that fan 102 rotates at the same speed as compressor section 104 and turbine section 112 or through a gear system.

During operation of turbine engine 100, incoming air is pressurized by fan 102, compressor section 104. The compressed air is then mixed with fuel and ignited in combustor 108. The combusted air/fuel mixture is then expanded through turbine section 110 and turbine section 112. Work is extracted from the combusted air/fuel mixture during its expansion through the turbine sections. The work extracted by turbine section 110 may be used to power compressor section 104 and various auxiliary loads via the auxiliary gearbox 114.

As explained earlier, the above operation is self-sustaining, meaning that the work output of the turbine sections, and in particular turbine section 110, is alone sufficient to drive the compressor sections, and in particular compressor section 104, such that the incoming air is pressurized so that the air/fuel mixture may be combusted and provide the required energy to drive the turbines. Until the operation of the turbine engine 100 is self-sustaining, work must be provided from some system other than turbines to rotate the compressors. These other components are referred to as starters.

Electric starters may be configured to bring a turbine engine 100 from rest to a point of self-sustaining operation. The electric starter converts electrical energy into rotational motion that drives one or more spools/shafts of the turbine engine. This electrical power could be supplied by systems onboard an aircraft (e.g., batteries or other electrical power storage devices), electrical power generators (e.g., an auxiliary power unit (APU), another main turbine engine, etc.), or systems external to the aircraft (e.g., a starting cart, etc.).

Electric starters may be coupled to one or more spool/shafts of the turbine engine 100 through an auxiliary gearbox 114, however, advantage may be realized by mounting the electric starter generator directly to a shaft of the turbine engine.

Figure 2:
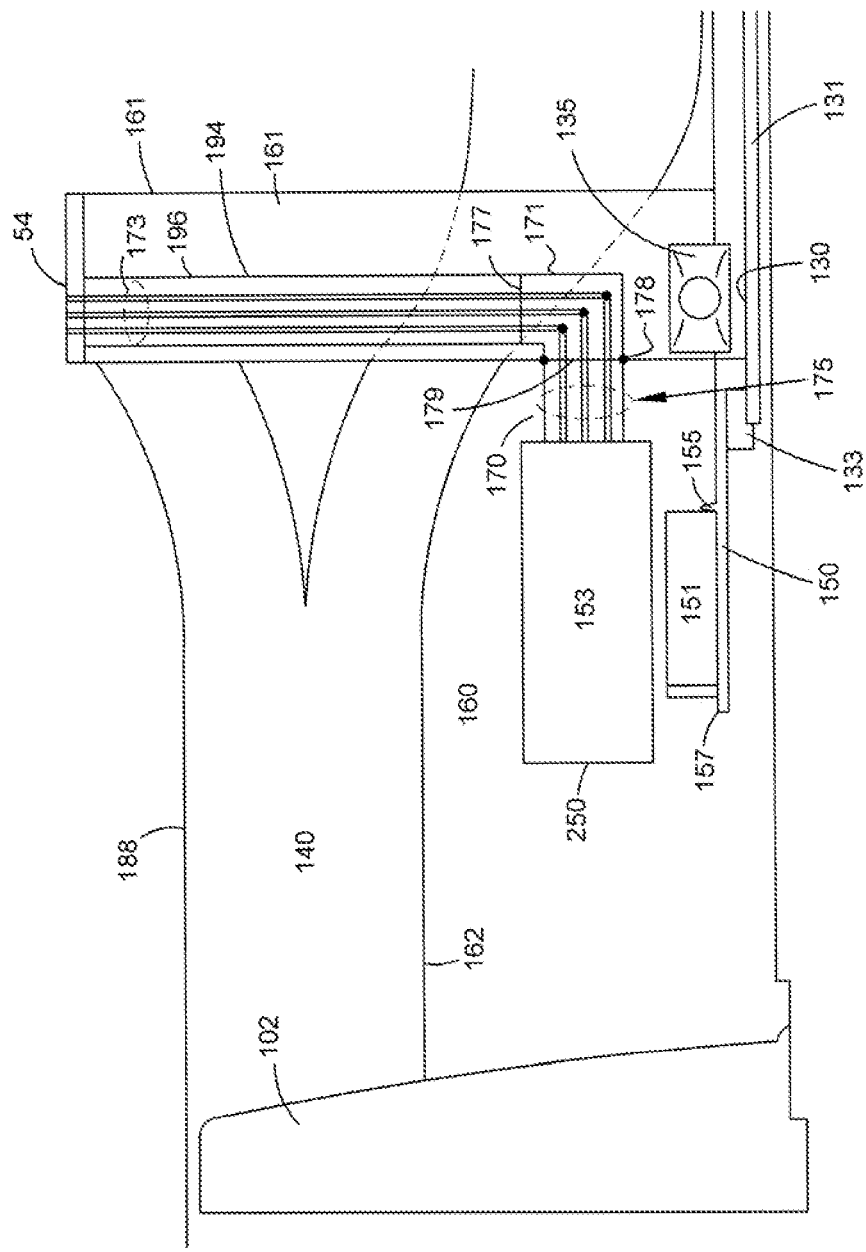
FIG. 2 is a cross-sectional view of the fan & front sump section of a gas turbine engine in accordance with the disclosed subject matter.
Figure 3:
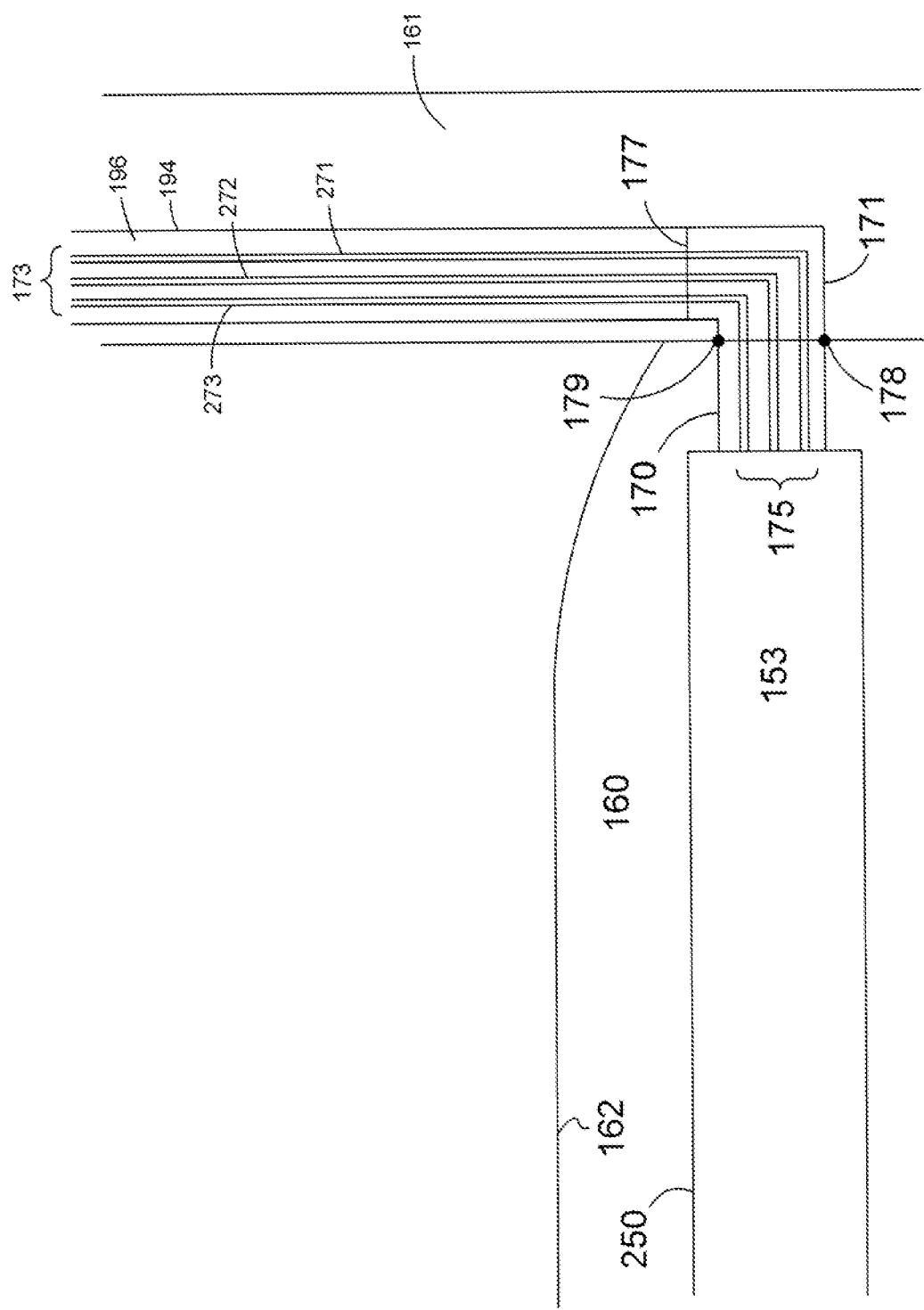
FIG. 3 is a perspective view of a support frame of a gas turbine engine.
Figure 4:
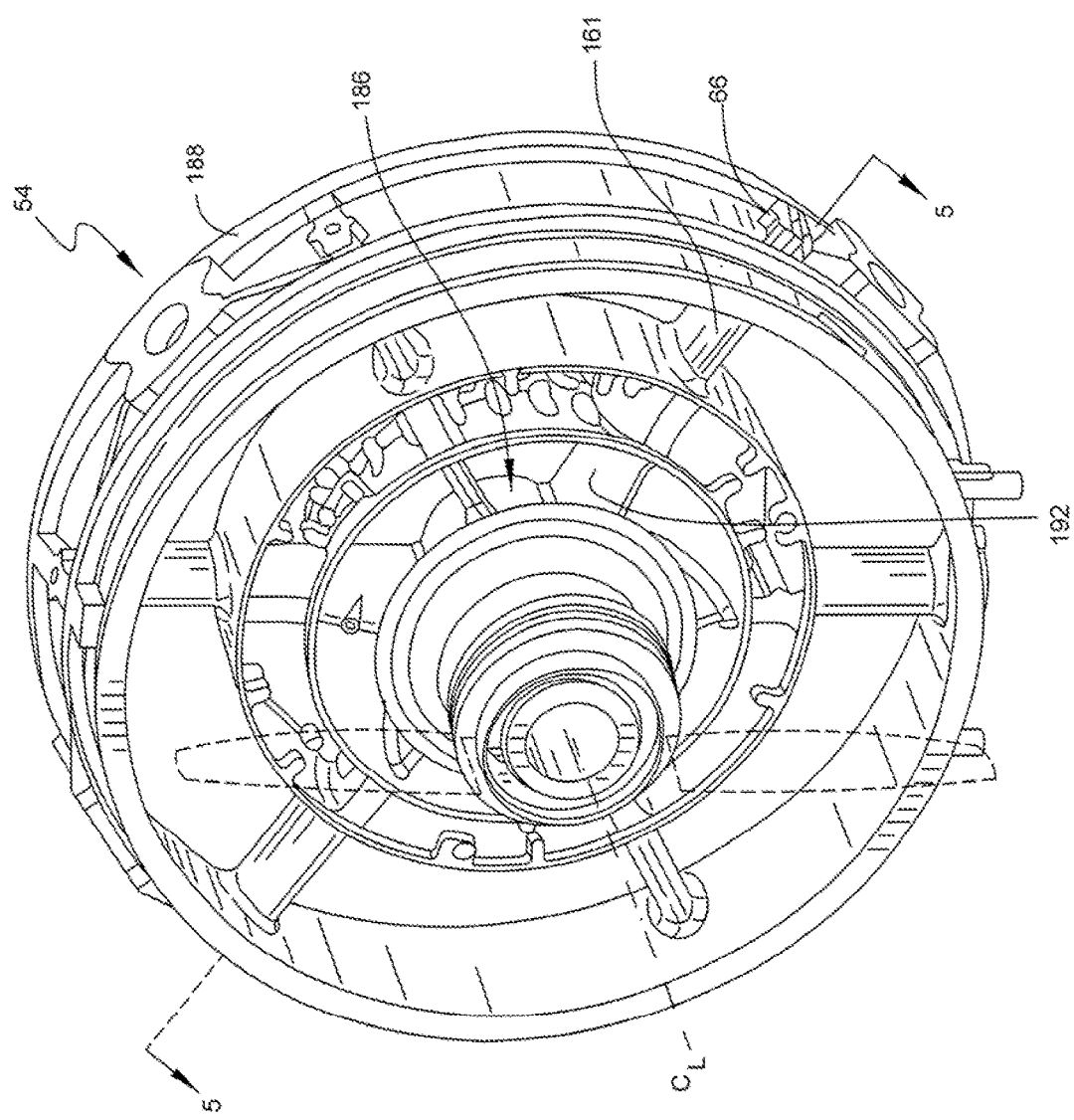
FIG. 4 is a perspective view of the support frame.

A gas turbine with an electric starter generator according to an embodiment of the disclosed subject matter is shown in FIG. 2. In order to avoid pyrotechnic starting and provide power offtake during operation, an Embedded Starter Generator (ESG)/Integrated Starter Generator (ISG) 250 is incorporated within the engine architecture shown in FIG. 2. By way of example, this ISG 250 provides 5 kW of nominal power offtake. A closer view of the Fan & Front Sump Section is shown in FIG. 3, which highlights the ISG 250. FIG. 4 depicts a 3D view of a Support Frame 54.

A turbine engine may also contain a high pressure spool and a low pressure spool that are coaxial to each other. The low pressure spool may be connected via the low pressure shaft 120 (LP shaft) which rotates the fan 102. The high pressure spool may connect by the high pressure shaft 130 (HP shaft). Structural support for the shafts may be provided by support frame 54 and forward struts 161 which may extend radially inward from the outer casing 188 through the air inlet passage 140. A bearing 135 may physically couple the high pressure shaft 130 to the support frame 54.

As shown in FIG. 2, the sump region 160 may surround the forward portion of the LP shaft 120, while being located axially forward of the forward most portion of the HP shaft 130, and be contained by an inner boundary of the air inlet passage 140.

The ISG 250, composed of the rotor 151 and stator 153, may be situated within the sump 160. The stator coils 153, may be parallel with the HP 130 or LP shaft 120. A first set of radial electrical conductors 173 may extend radially inward from the outer casing 188 and may be contained within a forward strut 161 defining an electronic conduit 194. A second set of axial electrical conductors 175 may extend axially aft of the stator coils 153. Each of the electrical conductors may reversibly connect to an elbow/pin connector 171. The elbow 171 may contain an axially forward facing electrical interface 179 which corresponds to each axial electrical conductor 175 exiting the stator coils 153, and a radially outward facing electrical interface 177 which corresponds to each radial electrical conductor 173. The first set of radial electrical conductors 173 may reversibly connect to the second set of axial electrical conductors 175 within the elbow/pin connector 171 An O-ring 178 may surround the second set of axial electrical conductors 175 to ensure oil does not leak from the front sump 160 into the strut 161.

The rotor 151 of the ISG 250 may be situated radially inward and concentric to the stator coils 153. The rotor 151 may be coupled to an adapter shaft 150. The rotor may be located axially in place by a shoulder 155. The adapter shaft 150 may be situated forward of the HP shaft bearing 135 and be coupled to the HP shaft 130. The adapter shaft 150 may have an outer diameter greater than the outer diameter of the HP shaft 130. The adapter shaft 150 may be secured to the HP shaft 130 by a spanner nut 133 concentric with both the adapter shaft 150 and the HP shaft 130.

To transmit 5 kW of power, the cable is at least 12 AWG wire and the nominal diameter of this gauge wire is 0.157 inch. The bend radius of these cables may be up to three times the wire diameter making routing around corners difficult, if not impossible, in some cases. Further, the 3 phase current will require three (3) of these cables. Structural support for the rotors is provided by the support frame 54 and specifically, by the struts 161. Since the struts 161 pass through the flow path 140, the width is minimized to reduce performance losses. For example, the front support strut 161 thickness may be only 0.250 inches and thus, routing of the cables is a major obstacle in the integration of an ISG 250 in the front sump 160.

A solution to this issue involves a receptacle/interface 179 and plug 170, to create an "electrical joint" or pin connector 171 in the front sump 160. FIG. 3 depicts a configuration of a pin connector 171 according to an embodiment of the disclosed subject matter. A plug 170 would protrude aft of the ISG 250. This will allow the ISG 250 to be installed axially from the front of the engine. An O-ring 178 on the receptacle 179 would engage the strut 161 to prevent oil from leaking from the sump 160 into the strut 161. Three conductors 173 (271, 272 and 273) would be inserted radially from outside the support frame 54 through the strut 161 and engage the pin connector 171. A flange may be utilized to attach the three conductors 173 to the support frame 54/strut 161 and radially position relative to the pin connector 171. The three wires (conductors) 173 may be encased by insulation 196 into a solid component. This will provide some stiffness holding the pin connector 171 firm and make installation easier. It is additionally envisioned that the conductors 173 may be "flattened" to reduce the cross section of the conductors 173 (e.g. ribbons). The depths of the three prongs (conductors) 173 would be staggered with depth increasing with a more aft axial position. These prongs 173 would engage the conductors 175 within the mating pin connector 171 at the right depth to allow enough separation to insulate the conductors/wires 173 from each other.

The advantage of this arrangement is to effectively create a 90° bend by forming an electrical joint in the power cables. Thus, the pin connector 171 makes it possible to reduce the overall space claim required to egress cables from the ISG 250 through the strut 161 and out of the support frame 54.

Figure 5:
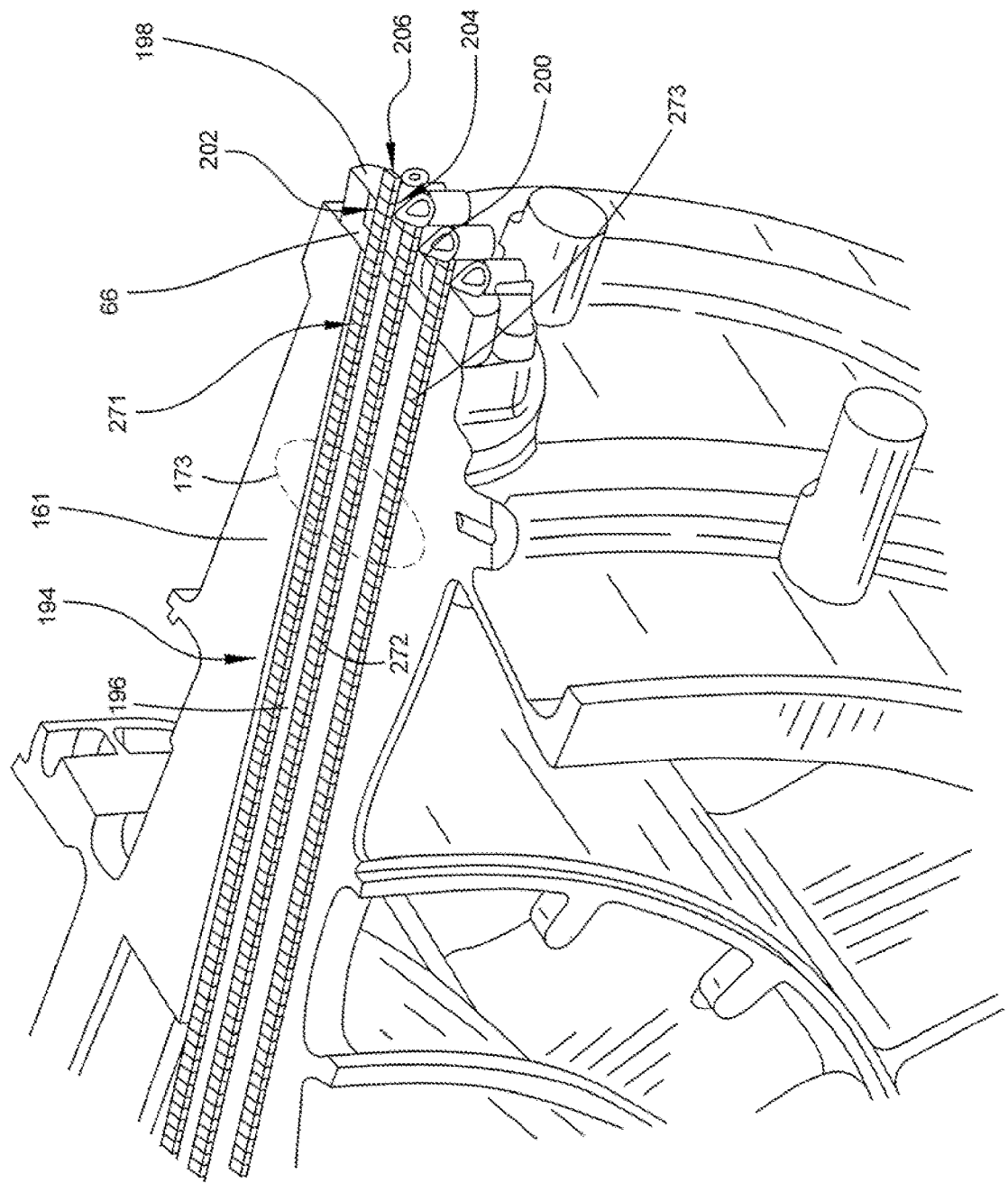
FIG. 5 is a close-up cross-sectional view of the support frame strut section of the gas turbine engine.

As shown in FIG. 3, the elbow/pin connector 171 may rest completely within the strut 161. A portion of the elbow 171 may extend into the sump area 160. An O-ring 178 may couple/seal the elbow 171 and a casing for the axial electrical conductors 175. As shown in FIG. 5, the first set of radial electrical conductors 173 may be made up of conducting radial ribbons, rods or wires 173, one for each electronic phase of the generator output; a first conductor 271, a second conductor 272, and a third conductor 273 (for a three phase generator). Though depicted as a three phase starter generator, the system described herein is not limited to three phases. Each conductor may be separately insulated within the strut 161.

As best shown in FIGS. 4 and 5, the strut 161 illustratively includes a smooth outer surface 192 to minimize flow resistance. The strut 161 illustratively includes an electronic conduit 194 defined therein that extends radially between the hub 186 and the outer casing 188. The electronic conduit 194 illustratively receives the radial electrical conductors 173 therethrough and extends between the pin connector 171 and the terminal base 66. Positioning the radial electrical conductors 173 within the strut 161 provides physical protection while permitting conductive cooling of the conductors by air passed over the strut 161.

In the illustrative embodiment, the conductors are each embodied as a ribbon formed of electrically conductive material, for example, copper. The conductors each may include the exterior threads (not shown) disposed on one end for fixed connection or a cylindrical shape to slidably connect with the pin connector 171 and the terminal base 66 to form a floating connection to accommodate thermal expansion. The conductors are illustratively embodied to be secured within the electrical conduit 194 surrounded with potting compound/insulating material 196 to electrically isolate the conductors from each other. The conductors illustratively extend radially between the pin connector 171 and the terminal base 66 at an angle relative to a plane that is perpendicular to the engine center line. The conductors 173, while not shown in FIG. 4, may extend radially at angles from 90 degrees to 40 degrees.

As best shown in FIG. 5, the terminal base 66 is illustratively attached to the outer casing 188 at a position spaced apart from the connector 171 along the a radial axis of the strut 161. The terminal base 66 illustratively includes a body 198 having three slots 200 defined radially therethrough each including a terminal socket 202 may be arranged therein to slidably receive one of the ribbons/rods/wires therein for electrical connection. The terminal sockets 202 are each illustratively embodied to include a hollow cylinder section 204 disposed within the body 198 and a stem 206 extending from the hollow cylinder section 204 radially outside of the body 198 as a terminal post for connection to electrical loads of the engine 100. The terminal sockets 202 are illustratively formed of electrically conductive material to transmit electric power between the ISG 250 and electrical loads of the engine and vehicle. In some embodiments, the conductors 173 may be permanently fixed to the terminal base 66 and have a floating connection.

Figure 6:
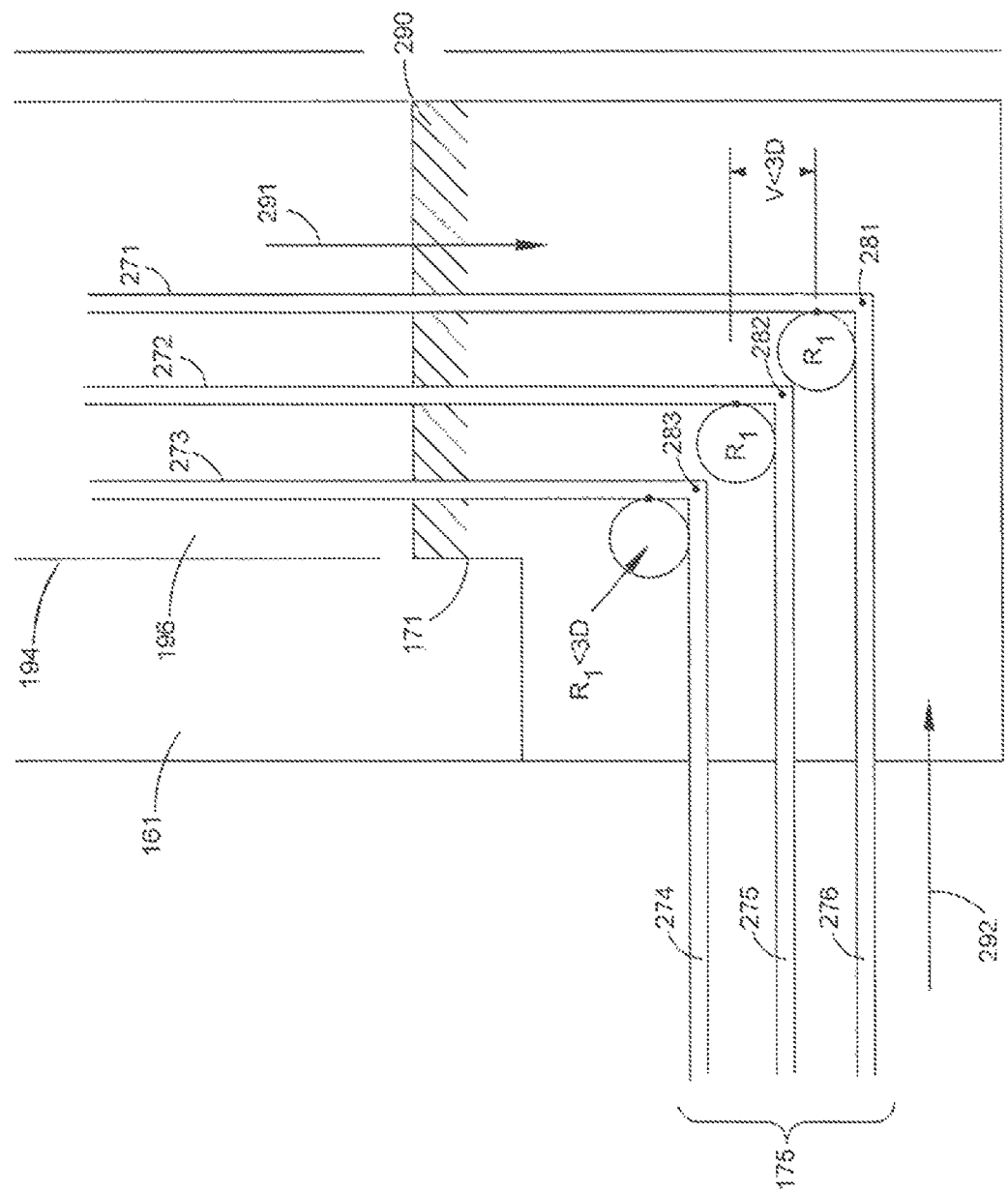
FIG. 6 is a cross-sectional view of the pin connector elbow in accordance with an embodiment of the disclosed subject matter.

FIG. 6 shows the connections within the elbow/pin connector 171 in more detail. As may be seen, each of the first set of electrical conductors extends radially (shown by directional arrow 291) into the first interface of the elbow 171 a different amount than the others. The first ribbon 271, being the furthest aft may extend deeper into the elbow 171 than the second ribbon 272, or third ribbon 273. The second set of electrical conductors may be made up of conductive axial ribbons, one for each electronic phase of the generator output; a fourth ribbon 274, a fifth ribbon 275, and a sixth ribbon 276 (for a three phase generator). Each ribbon may extend axially (shown by directional arrow 292) into the second interface of the elbow 171 a different amount than the others and connect to a corresponding radial ribbon. Sixth ribbon 276 may connect with first ribbon 271 at first connection 281, fifth ribbon 275 may connect with second ribbon 272 at second connection 282, and fourth ribbon 274 may connect with third ribbon 273, at third connection 283. In an ideal set up each conductor of the set of electrical conductors has a radius of curvature greater than three times their respective diameter. If enough room does not exist, an angle formed between a respective ribbon of the first set of electrical conductors and a ribbon of the second set of electrical conductors may be acute.

Figure 7:
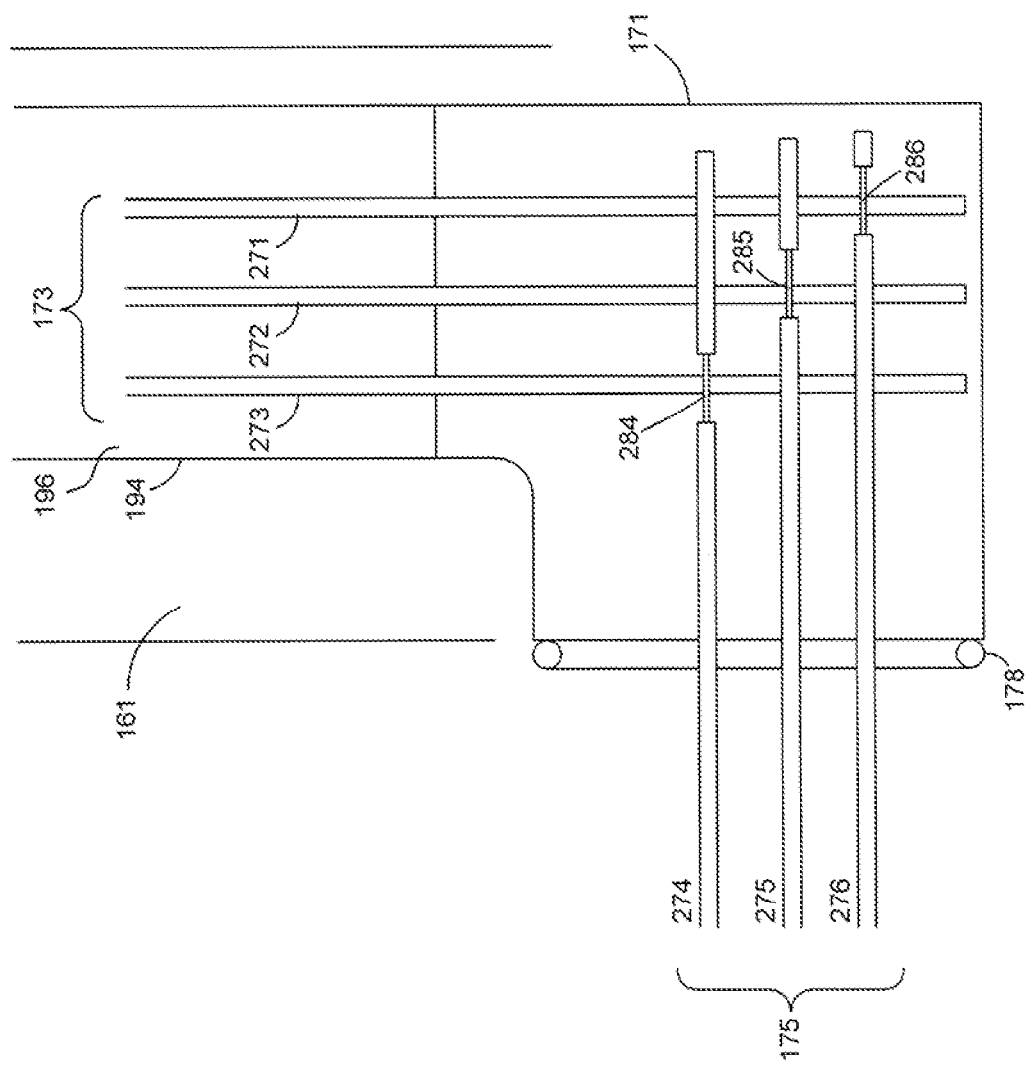
FIG. 7 is a cross-sectional view of the pin connector elbow in accordance with another embodiment of the disclosed subject matter.

As shown in FIG. 7, each of the ribbons of the first set of electrical conductors 173 may be made to extend the same distance into the elbow 171. In this case, each ribbon may be insulated within the elbow 171 and would be exposed within the elbow 171 at a different radial location than the other ribbons. In this case, each conductor of the second set of electrical conductors 175 may be made to extend the same amount into the elbow 171 and be insulated within the elbow 171, but be exposed within the elbow 171 at a different axial location than the other conductors. The different axial locations of the second set of electrical conductors 175 may then correspond with the respective different radial locations of the first set of electrical conductors 173. Third ribbon 273 may connect with fourth ribbon 274 at fourth connection 284. Fifth ribbon 275 may connect with second ribbon 272 at fifth connection 285. Sixth ribbon 276 may connect with first ribbon 271 at sixth connection 286. Additionally, to aid in separation of the respective conductors, they may also be circumferentially offset (limited by the width of the support strut 161).

Figure 12:
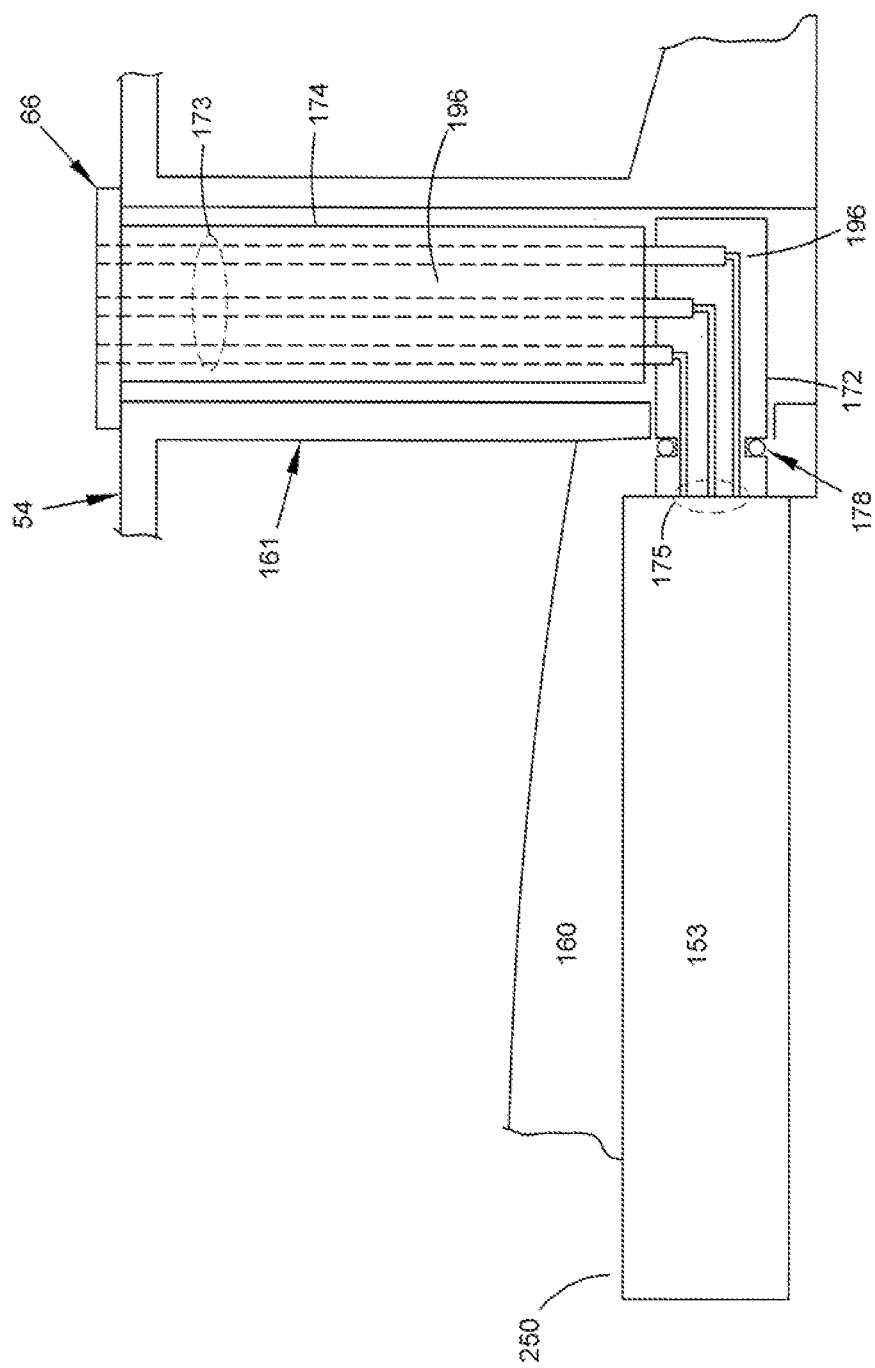
FIG. 12 is a cross-sectional view of a pin connector and strut plug in accordance with another embodiment of the disclosed subject matter.
Figure 13:
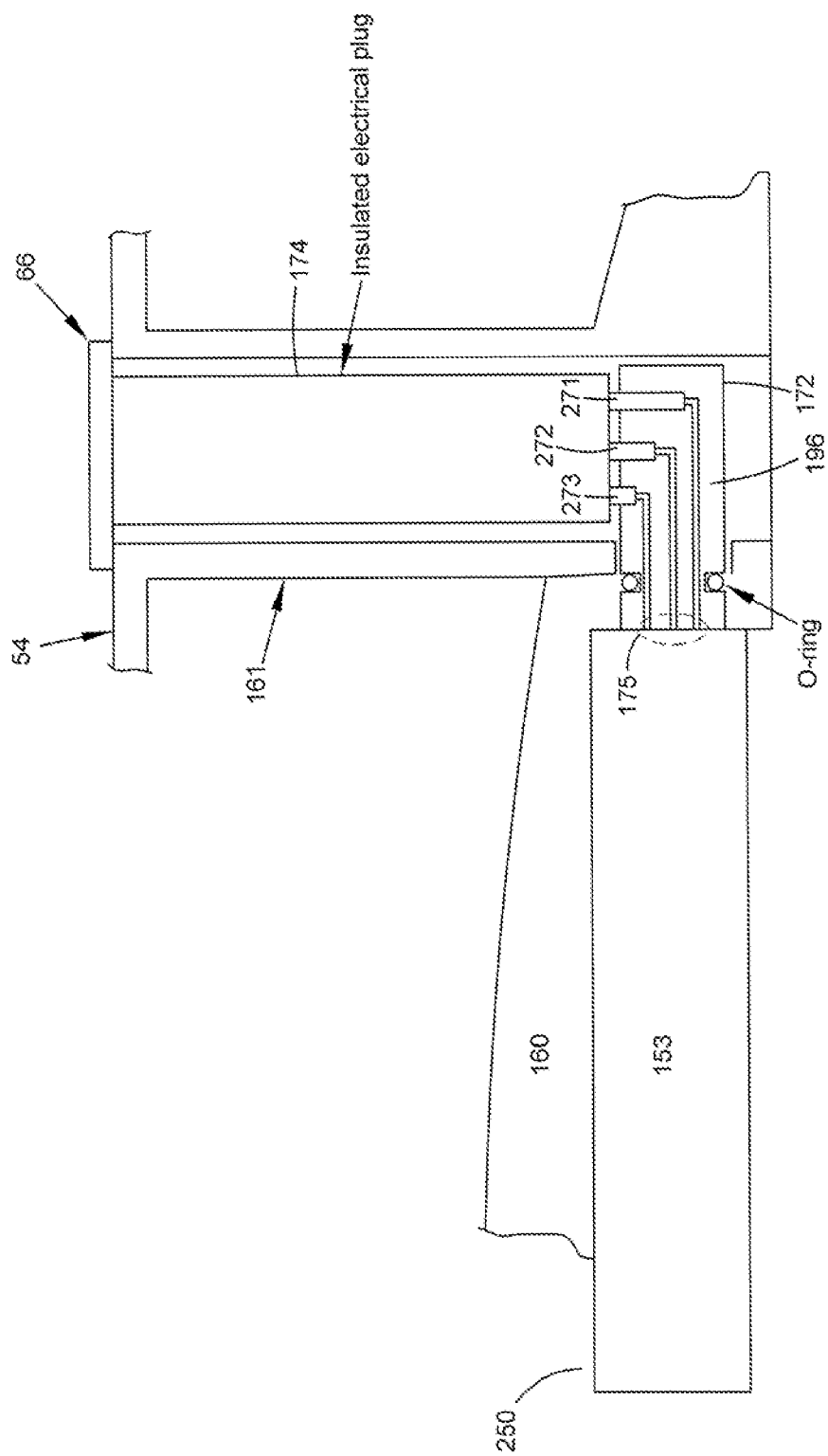
FIG. 13 is a cross-sectional view of a pin connector and strut plug with integral shunts in the pin connector in accordance with another embodiment of the disclosed subject matter.

FIG. 12 illustrates another embodiment of the disclosed subject matter. In FIG. 13, a strut plug 174 is formed for insertion within the strut 161. The strut plug 174 includes the electrical conductors 173 encased within an insulated body. The strut plug 174 during assembly is inserted radially within the strut 161 through the conduit 194 whereby the terminal ends of the conductors 173 are received in a plug receptacle 172 containing contacts for the electrical conductors 175 of the ISG 250. The terminal base 66 mounted on the support structure 54 provides a connection to the electrical power loads and power sources of the engine and vehicle.

In this embodiment the plug receptacle 172 receives the strut plug 174 as opposed to other embodiments in which the pin connector 171 receives the plug 170. As shown in FIG.

12, an O-ring 178 positioned on the plug receptacle interacts with a corresponding opening in the strut 161 to seal the interior of the strut 161 from fluids within the sump 160. The plug receptacle 172 may have multiple cavities for receiving the conductors 173. Additionally, the plug receptacle 172 may have a locking mechanism(s) (not shown) for retaining the strut plug 174 within plug receptacle 172. In the embodiment of FIG. 12, the ISG 250 is first installed, followed by the insertion of the strut plug 174. As shown in FIG. 12, each of the conductors 175 in the plug receptacle 172 have a different radial and axial location matching the terminal ends of the conductors 173. However, as shown in FIG. 13, it is also envisioned that with the use of shunts 176 in the plug receptacle 172, each of the conductors 271, 272 and 273 in the strut plug may terminate at the same radial location, the radial span between the terminal ends of conductors 173 and the conductors 175 bridged by an integral shunt.

Figure 8:
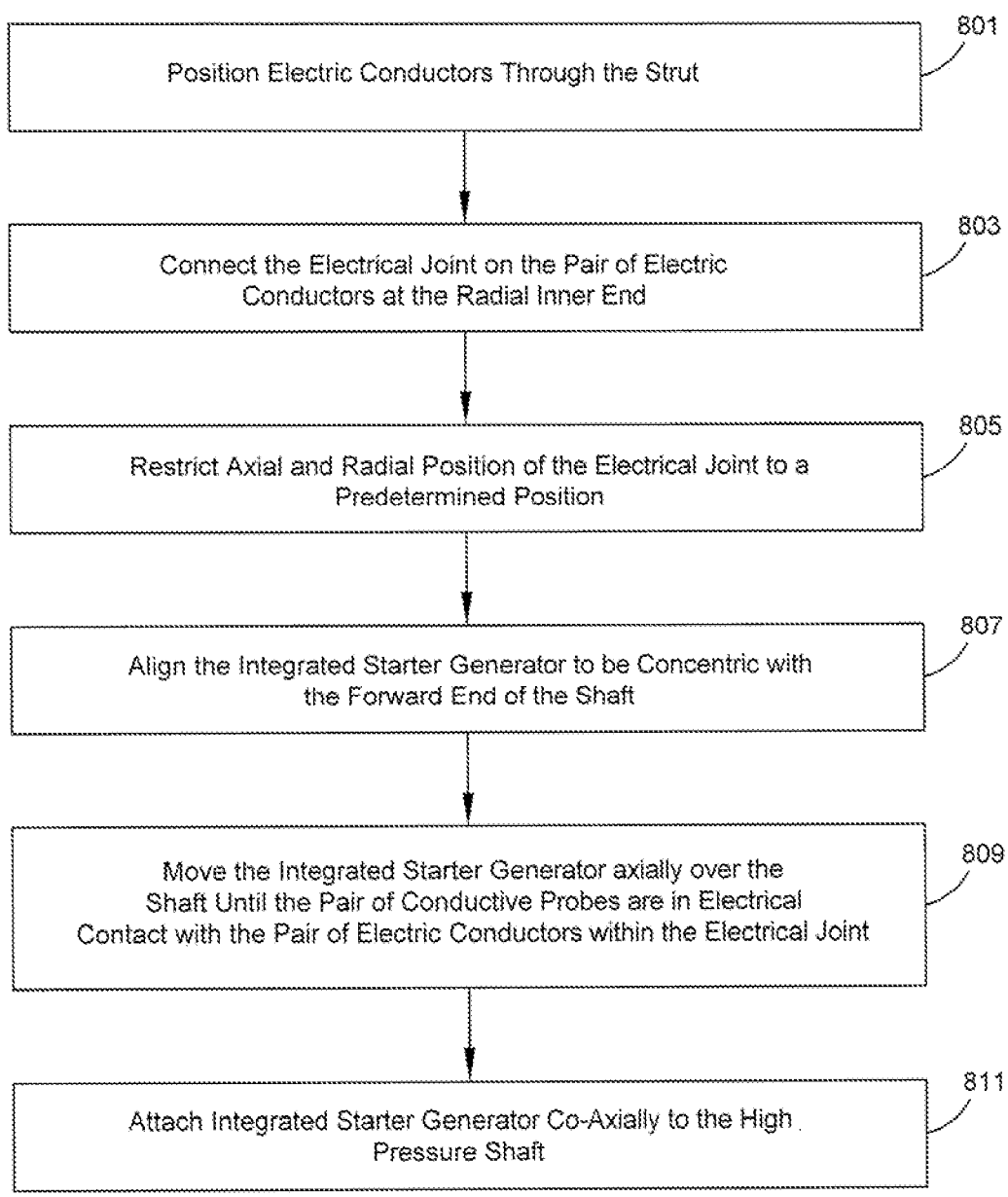
FIG. 8 is a flow chart of a method of installing an integrated starter generator according to embodiments of the disclosed subject matter.

FIG. 8 is a flow diagram describing a method by which a shaft ISG may be installed in a turbofan engine. The integrated starter generator may include a pair (a pair for single phase, a trio for 3 phase etc.) of conductive probes extending axially from the integrated starter generator. The turbofan engine may include a strut, an air passage and a shaft. The strut 161 may contain a pair of electric conductors, each with a radius of curvature greater than three. The strut 161 is positioned through a passage.

At block 801 the pair of electric conductors are positioned through the strut. Each pair of electric conductors may have a radial inner end and a radial outer end. At Block 803 an electrical joint is connected on the pair of electric conductors at the radial inner end. In an alternate embodiment, the pair of electric conductors are formed into a strut plug, and are positioned within the conduit in the strut 161 after the positioning of the ISG 250 and the plug receptacle. At block 805 the axial and radial position of the electrical joint is restricted to a predetermined position. At block 807 the integrated starter generator 250 is aligned to be concentric with the forward end of the shaft. At block 809 the integrated starter generator is axially moved over the shaft until the pair of conductive probes are in electrical contact with the pair of electric conductors within the electrical joint. As noted above, in the alternative embodiment the electric joint may be sealed by an O-ring compressed between the plug 170 of the integrated starter generator 250 and the electrical joint 171 via the axial movement. The O-ring may be placed over the pair of probes prior to the axially moving the integrated starter generator. At block 811 the integrated starter generator may be attached to the shaft, wherein the integrated starter generator is co-axial with the shaft (either the HP shaft 130 or the LP shaft 120).

The inner ends of electrical conductors 173 may be offset radially within the electrical joint and the terminal ends of the conducting probes 175 may be offset axially to align with the respective inner ends of the electrical conductors 173.

As noted above, implementing an integrated starter generator 250 mounted directly to the HP shaft 130 eliminates need for the accessory gearbox module and the associated negative attributes. It also directly facilitates enhanced vehicle packaging since the accessories (engine and vehicle) may be placed in more advantageous locations allowing the engine profile to be more circular than ovular.

In order to fit within the tight size requirements in expendable applications, the ISG 250 may be packaged on the forward side of the shafting within the s duct (passage 140) of the front support strut 161. The sump area 160 is shown in FIG. 2 (as a 2D cross-section) along with ISG device 250.

In the arrangement shown in FIG. 2, the ISG 250 is designed to be assembled on the HP Shaft 130 using a shaft coupling connector (or adapter shaft 150). Since generator size decreases with increased rotor speeds, it is advantageous from a cost, weight, and packaging perspective to mount the ISG 250 in a location that maximizes shaft speeds. By mounting the ISG 250 to the HP shaft 130 which by way of example only may operate near 50,000 RPM, the ISG 250 may be sized smaller than if connected to the LP shaft 120 which as an example operates at speeds of 30,000 RPM. The adapter shaft 150 shown in FIG. 2 has a larger OD than the HP shaft 130 and allows assembly of the HP bearing 135. Various conventional means of piloting and coupling are envisioned such as using a bolted flange, friction, splines, curvics, or mounting directly to the shaft.

An alternative to HP shaft 130 mounting is mounting the ISG 250 to the LP shaft 120 and increasing the size of the device accordingly. Depending on the requirements of the systems, there may be constraints for adapting to the HP shaft 130. For instance, requiring oil to be delivered to both the forward LP bearing and forward HP bearing. If it is determined that there is insufficient space to package the oil system within the front sump, that may restrict which shaft the ISG 250 is able to be mounted to. Therefore, both LP shaft 120 and HP shaft 130 mounting locations are envisioned depending on the engine configuration.

In integrating an ISG 250 within an engine architecture for expendable engine applications, where size and cost are major drivers in the design of components, the ISG 250 is preferably mounted to the HP shaft 130 to minimize the size of the device; however, as noted earlier it may also be mounted to the LP shaft 120. Using this arrangement, customer requirements may be achieved for nominal power offtake during operation while also balancing cost, size, and weight requirements.

FIG. 2 discussed above, illustrates an embodiment of the ISG 250 attached to the HP shaft 130, the adapter shaft 150 is located in the sump region 160 which is axially located over the forward portion of the LP shaft 120 and located axially forward of the forward most portion of the HP shaft 130. The sump region being located radially between the LP shaft 120 and an inner boundary of an air inlet passage 162. The adapter shaft 150 is forward of the high pressure shaft bearing 135 and may hold the HP shaft bearing 135 in place with respect to the axial direction. The adapter shaft 150 is rotational coupled to the HP shaft 130, the adapter shaft 150 having an outer diameter greater than the outer diameter of the HP shaft 130. The rotor 151 of the electric starter generator 250 coupled to the adapter shaft 150 between rib 152 and retaining ring 154.

Figure 9:
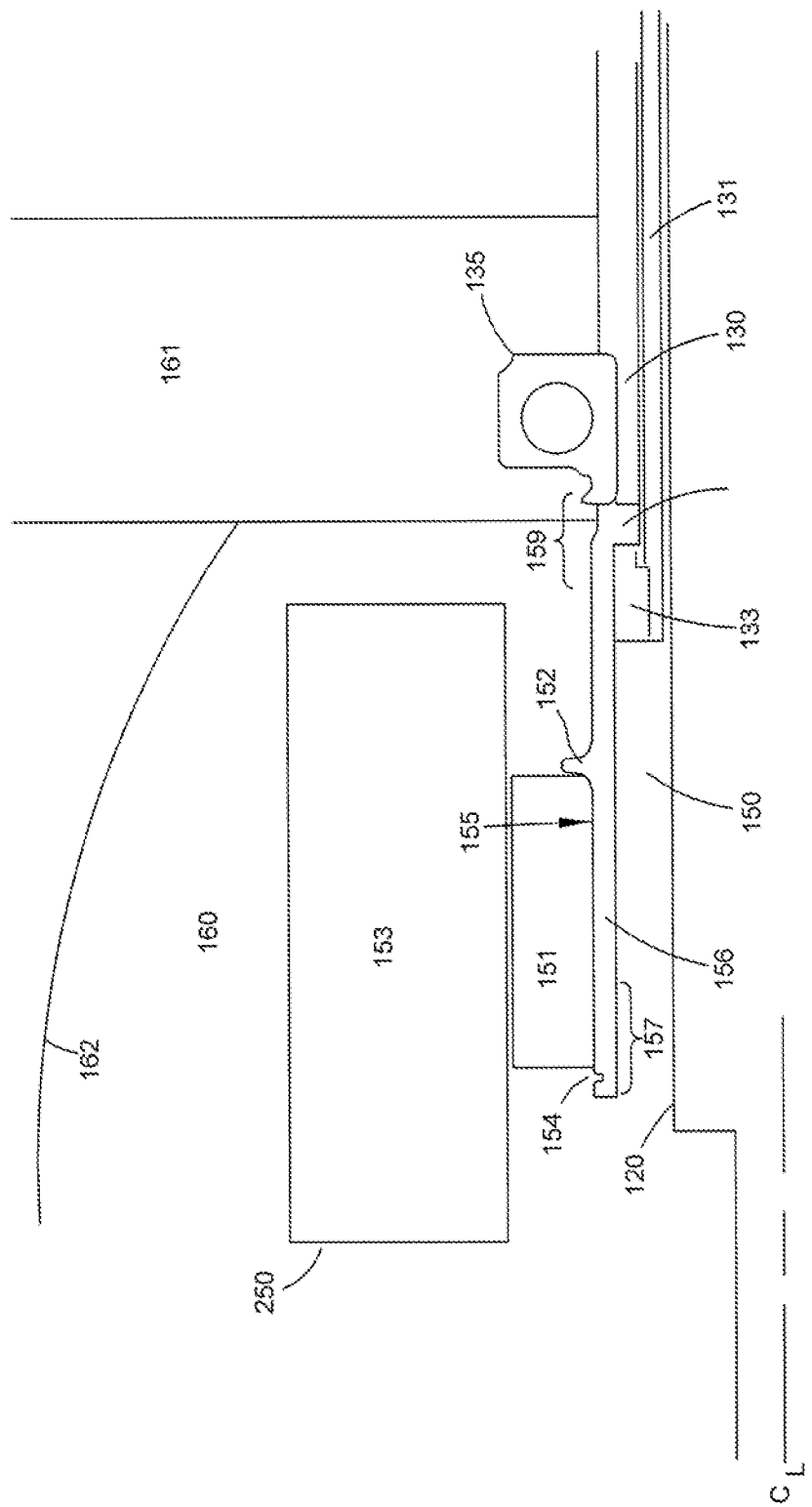
FIG. 9 is a cross-sectional view of an adapter shaft attached to the HP shaft in accordance with embodiments of the disclosed subject matter.

As shown in FIG. 9, the adapter shaft 150 is defined by a cylinder 156 having an upstream end 157 and a downstream end 159, the cylinder 156 with an outer diameter greater than the outer diameter of the turbine shaft. The cylinder 156 includes a radially outer surface 155 upon which the rotor 151 of the electric device 250 is attached.

A radial flange 158 is connected to one of the downstream end 159 of the adapter shaft 150. The radial flange 158 extends radially inward from the outer cylinder 156 to define a bore hole, the bore hole having an inner diameter less than or equal to the outer diameter of the HP shaft 130; the outer surface 155 of cylinder 156 defining an integral rib 152 towards the downstream end 159, the rib 152 extending radially from the outer surface 155. The rib 152 and retaining ring 154 helps retain the rotor 151 or other component upon the adapter shaft 150, other attachment mechanisms are also envisioned. A spanner nut 133 axially retaining the radial flange 158 with respect to the HP shaft 130, via an axial facing surface or rib restricting rearward axial movement of the adaptor shaft.

As shown in FIG. 9, a spanner nut (concentric with the HP shaft 130 and the adapter shaft 150) may connect the adapter shaft 150 and the HP shaft 130 together. The adapter shaft 150 may also be secured to the HP shaft 130 via a tie bolt 131 passing through the HP shaft 130 and the spanner nut 133.

Figure 10:
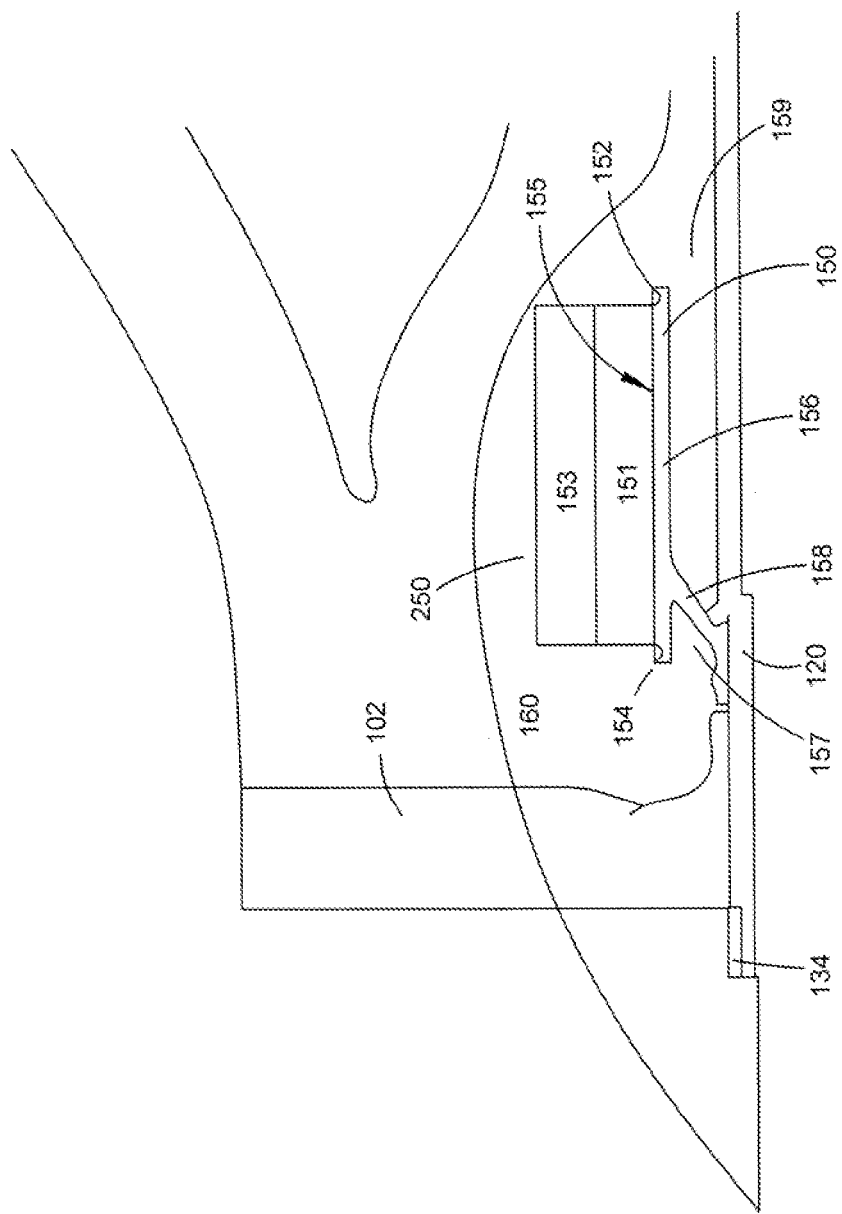
FIG. 10 is a cross-sectional view of an adapter shaft attached to the LP shaft in accordance with embodiments of the disclosed subject matter.

FIG. 10 illustrates an embodiment of the ISG 250 attached to the LP shaft 120, the adapter shaft 150 is located in the sump region 160 which is axially located over the forward portion of the LP shaft 120. The sump region is located radially between the LP shaft 120 and an inner boundary 162 of an air inlet passage 140. The adapter shaft 150 is rotational coupled to the LP shaft 120, the adapter shaft 150 having an outer diameter greater than the outer diameter of the LP shaft 120. The rotor 151 of the electric starter generator 250 coupled to the adapter shaft 150 between rib 152 and retaining ring 154. The relative location of ribs or retaining rings may be reversed, moreover in some applications the use of only retaining rings, or only ribs may be desirable, like the adapter shaft as described with respect to the HP shaft 130 connection, the adapter shaft 150 includes a cylinder 156 having an upstream end 157 and a downstream end 159, the cylinder 156 having an outer diameter, the outer diameter greater than the outer diameter of the LP shaft 120. The cylinder 156 having a radially outer surface 155 upon which the rotor 151 is mounted.

A radial flange 158 connects to the upstream end 157 of the cylinder 156. The flange 158 extends radially inward from the cylinder 156 and defines a bore hole having an inter diameter less than or equal to the outer diameter of the LP turbine shaft 120; the outer surface of cylinder 155 may include an integral rib 152, or other retaining mechanism at the downstream end, the rib extending radially from the outer surface 155. While the rotor 151 is shown being retained by the rib 152 and retaining ring 154, other attachment mechanisms are equally envisioned. A spanner nut 134 retains the adapter shaft 150 axially positioned against a rib or seat on the LP shaft 120. The spanner nut 134 may compress the adapter shaft 150 against the LP shaft 120 via the fan rotor or other intervening LP spool components.

In some embodiments, during the start functionality of the ISG 250, electrical power is provided from the vehicle electrical bus to the ISG 250. Torque is created to accelerate the HP spool to initiate the engine start. At a predetermined limit, fuel flow is introduced and the ignitors are turned on. The size of the ISG 250 during this mode is a direct function of the desired start times, rotor inertia, rotor drag torque, and any additional applied forces (windmill) to the rotor. Once the engine reaches idle speed, the ignitors are turned off and the ISG 250 creates and delivers power to the power conditioning unit (PCU) which converts the varying input (voltage and frequency) to the desired vehicle electrical bus systems. Vehicles typically have multiple electrical buses to supply different voltage levels and/or types (AC or DC) to the vehicle and engine accessories.

In another embodiment, the ISG 250 may be coupled to both the LP shaft 120 and HP shaft 130. In circumstances of windmill starting, the ram air would spin the fan assembly attached to the LP Shaft. The ISG 250 may be designed with two sections of permanent magnet rotors, one being run by the LP shaft 120 and another connected to the HP Shaft 130, to provide coupling power during ram air start by transmitting power through the fan assembly 102 on the LP shaft to the HP shaft via the ISG 250, thereby providing the necessary power to the HP shaft for engine start. Once starting is initiated, these sections may provide power sharing or be decoupled to provide nominal offtake power during normal operation.

Figure 11:
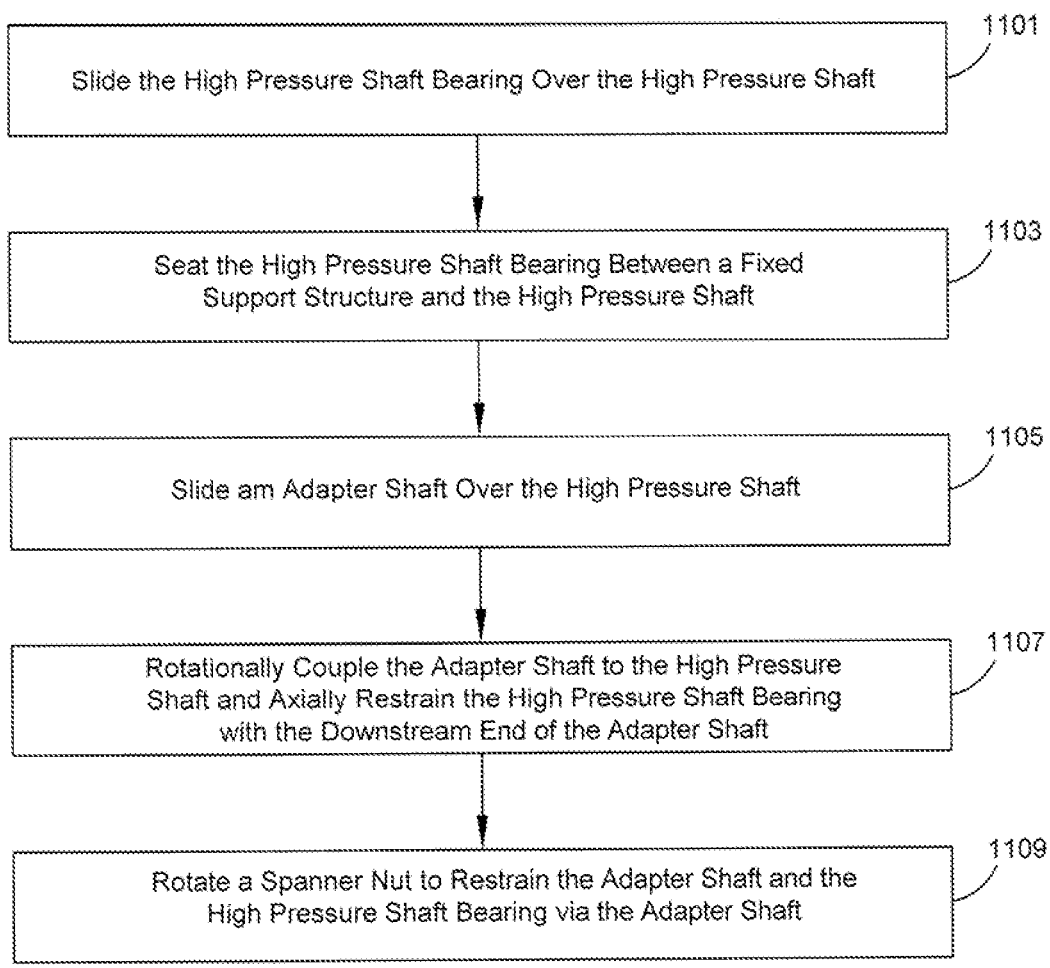
FIG. 11 is a flow chart of a method of installing an adapter shaft according to embodiments of the disclosed subject matter.

FIG. 11 is a flow diagram showing how a gas turbine engine with an ISG 250 may be assembled with a high pressure spool and a low pressure spool, each with a respective shaft.

At block 1101 a high pressure shaft bearing 135, maintained concentric with the high pressure shaft 130, is slid over the high pressure shaft 130. At Block 1103 the high pressure shaft bearing 135 is seated between a fixed support structure and the high pressure shaft 130. At Block 1105 the adapter shaft is slid over the high pressure shaft 130, At Block 1107 the adapter shaft is rotationally coupled to the high pressure shaft. The adapter shaft may then axially restrain the high pressure shaft bearing 135 with the downstream end of the adapter shaft. When coupling the shafts in this manner, each spline on the adapter shaft may be mated with the respective spline on the high pressure shaft 130.

At Block 1109 a spanner nut is rotated. The spanner nut 133 restrains the adapter shaft, which in turn restrains the high pressure shaft bearing 135. The spanner nut 133 may be threaded onto a tie bolt radially inward of the high pressure shaft 130. The spanner nut 133 may also be threaded directly onto the high pressure shaft 130.

Although examples are illustrated and described herein, embodiments are nevertheless not limited to the details shown, since various modifications and structural changes may be made therein by those of ordinary skill within the scope and range of equivalents of the claims. For example, while various gearboxes and coupling members have been described herein, one of ordinary skill will understand that these components may be modified, moved, or deleted to achieve a particular purpose.

What is claimed is:

1. A turbofan engine comprising:
  a high pressure spool and a low pressure spool, the low pressure spool including a low pressure shaft operably connected to a fan, the high pressure spool including a high pressure shaft operably connected to a high pressure turbine, the low pressure shaft and the high pressure shaft being co-axial with one another;
  a sump region axially concurrent with a forward portion of the low pressure shaft and located axially forward a forward most portion of the high pressure shaft, the sump region defined radially between the forward portion of the low pressure shaft and an inner boundary of a support frame;
  a forward strut extending radially from the sump region through the air inlet passage to a radially outward casing, the forward strut defining an electrical conduit;
  a first plurality of electrical conductors extending through the electrical conduit from an elbow to an outer interface on the radially outward casing;
  an electrical device within the sump region having a second plurality of electrical conductors extending axially away from the electrical device and parallel to the low pressure shaft;
  the elbow having a first interface facing radially outward and a second interface facing axially forward, the first plurality of electrical conductors extending through the first interface, and the second plurality of electrical conductors extending through the second interface;
  wherein each of the first plurality of electrical conductors reversibly contacts a respective one of the second plurality of electrical conductors within the elbow.

2. The turbofan engine of claim 1, further comprising an O-ring positioned between the second interface and the electrical device, wherein the second plurality of electrical conductors pass through the O-ring.

3. The turbofan engine of claim 1, wherein each of the first plurality of electrical conductors extends radially into the first interface of the elbow a different amount than the others.

4. The turbofan engine of claim 1, wherein the first plurality of electrical conductors is insulated within the elbow and each of the first plurality of electrical conductors is exposed within the elbow at a different radial location than the others.

5. The turbofan engine of claim 1, wherein the elbow is radially and axially fixed with respect to the forward strut.

6. The turbofan engine of claim 3, wherein each of the second plurality of electrical conductors extends axially into the second interface of the elbow a different amount than the others.

7. The turbofan engine of claim 4, wherein the second plurality of electrical conductors is insulated within the elbow and each of the second plurality of electrical conductors is exposed within the elbow at a different axial location than the others.

8. The turbofan engine of claim 7, wherein the different axial locations of the second plurality of electrical conductors corresponds with the respective different radial locations of the first plurality of electrical conductors.

9. The turbofan engine of claim 1, further comprising insulation separating the first plurality of electrical conductors within the conduit.

10. The turbofan engine of claim 1, wherein the electrical device is a generator.

11. The turbofan engine of claim 1, wherein the electrical device is a starter.

12. The turbofan engine of claim 1, wherein the first plurality of electrical conductors are ribbons.

13. The turbofan engine of claim 1, wherein each of the plurality of electrical conductors has a radius of curvature greater than three times their respective diameter.

14. The turbofan engine of claim 1, wherein an angle formed between a respective one of the first plurality of electrical conductors and one of the second plurality of electrical conductors is greater than 0 degrees and less than or equal to 90 degrees.

15. A method of installing an integrated starter generator in turbofan engine, the integrated starter generator including a pair of conductive probes extending axially from the integrated starter generator, the turbofan engine including a strut, an air passage and a shaft, the strut containing a pair of electric conductors, each having a radius of curvature greater than three, the strut passing through the passage, comprising the steps of:
  positioning the pair of electric conductors through the strut, each of the pair of electric conductors having a radial inner end and a radial outer end;
  connecting an electrical joint on the pair of electric conductors at the radial inner end;
  restricting the axial and radial position of the electrical joint to a predetermined position;
  aligning the integrated starter generator to be concentric with the forward end of the shaft;
  axially moving the integrated starter generator over the shaft until the pair of conductive probes are in electrical contact with the pair of electric conductors within the electrical joint;
  attaching the integrated starter generator to the shaft, wherein the integrated starter generator is co-axial with the shaft.

16. The method of claim 15, further comprising sealing the electric joint by compressing an O-ring between the integrated starter generator and the electrical joint via the axial movement.

17. The method of claim 16, wherein the O-ring is placed over the pair of probes prior to the axially moving the integrated starter generator.

18. The method of claim 15, further comprising offsetting the inner ends of the pair of electrical conductors radially within the electrical joint and offsetting terminal ends of the pair of conducting probes to axially align with the respective inner ends of the pair of electrical conductors.

19. The method of claim 15, wherein the shaft is a high pressure shaft.

* * * * *